(12) United States Patent
Ido et al.

(10) Patent No.: US 9,615,424 B2
(45) Date of Patent: Apr. 4, 2017

(54) LIGHT SOURCE DEVICE, LIGHTING DEVICE, AND LUMINAIRE

(71) Applicant: Panasonic Intellectual Property Management Co., Ltd., Osaka (JP)

(72) Inventors: Shigeru Ido, Osaka (JP); Hiroshi Kido, Osaka (JP); Akinori Hiramatu, Nara (JP); Junichi Hasegawa, Osaka (JP); Daisuke Ueda, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/615,739

(22) Filed: Feb. 6, 2015

(65) Prior Publication Data
US 2015/0257212 A1 Sep. 10, 2015

(30) Foreign Application Priority Data

Mar. 7, 2014 (JP) ................................ 2014-045605

(51) Int. Cl.
*H05B 33/08* (2006.01)

(52) U.S. Cl.
CPC ....... *H05B 33/089* (2013.01); *H05B 33/0815* (2013.01); *H05B 33/0824* (2013.01); *H05B 33/0827* (2013.01); *H05B 33/0845* (2013.01); *Y02B 20/346* (2013.01)

(58) Field of Classification Search
CPC .................................................. H05B 33/0815
USPC .......................................... 315/192, 291–311
See application file for complete search history.

(56) References Cited

U.S. PATENT DOCUMENTS

| | | | |
|---|---|---|---|
| 2005/0062445 A1 | 3/2005 | Toyota et al. | |
| 2005/0117367 A1 | 6/2005 | Chikugawa | |
| 2008/0030185 A1* | 2/2008 | Metsker et al. | 323/304 |
| 2011/0169423 A1* | 7/2011 | Huang et al. | 315/297 |
| 2012/0013267 A1* | 1/2012 | Yoshio et al. | 315/297 |
| 2012/0319602 A1 | 12/2012 | Naruo et al. | |
| 2013/0175933 A1* | 7/2013 | Nakamura et al. | 315/186 |
| 2013/0271019 A1* | 10/2013 | Tsai et al. | 315/192 |
| 2013/0334976 A1* | 12/2013 | Lin et al. | 315/193 |
| 2014/0292220 A1* | 10/2014 | Trattler | 315/287 |

FOREIGN PATENT DOCUMENTS

| | | |
|---|---|---|
| JP | 2005-093196 A | 4/2005 |
| JP | 2005-184020 A | 7/2005 |
| JP | 2005-191528 A | 7/2005 |
| JP | 2007-220855 A | 8/2007 |
| JP | 2013-004280 A | 1/2013 |

* cited by examiner

*Primary Examiner* — Douglas W Owens
*Assistant Examiner* — Pedro C Fernandez
(74) *Attorney, Agent, or Firm* — Renner, Otto, Boisselle & Sklar, LLP.

(57) ABSTRACT

A control unit of a light source device after activation time is configured to turn on switches respectively connected in series with light sources, in prescribed order. The light source device and a lighting device are configured to transmit characteristics of the light sources, based on a voltage change depending on a pattern of on and off of the switches.

20 Claims, 4 Drawing Sheets

LIGHT SOURCE DEVICE, LIGHTING DEVICE, AND LUMINAIRE

CROSS REFERENCE TO RELATED APPLICATIONS

The application is based upon and claims the benefit of priority of Japanese Patent Application No. 2014-045605, filed on Mar. 7, 2014, the entire contents of which are incorporated herein by reference.

TECHNICAL FIELD

The disclosure relates generally to light source devices, lighting devices, and luminaries, and more particularly, to a light source device including a light source, a lighting device configured to supply power to the light source device to light the light source, and a luminaire using the light source device and the lighting device.

BACKGROUND ART

Conventionally, there is a luminaire as described in JP 2005-93196 A (hereinafter, referred to as "document 1"). The conventional example in the document 1 includes an illumination head (a light source device) in which one or more light-emitting elements are arbitrarily arranged, and a power supply device (a lighting device) that is configured to supply power to the illumination head.

Here, plural types of illumination heads are previously provided, which have different rated current values, depending on a difference between the numbers of light-emitting elements in the plural types of illumination heads. Any one of the plural types of illumination heads is selectively connected with the power supply device. The plural types of illumination heads include identification resistors. The respective identification resistors have resistance values corresponding to the rated current values of the plural types of the illumination heads.

The power supply device is configured to determine the type (a rated current value) of an illumination head connected with an output terminal of the power supply device by detecting a resistance value of an identification resistor of the connected illumination head, and adjust an output current according to the determination result.

That is, in the conventional example of the document 1, it is possible to light the light-emitting elements of each illumination head at its rated current, using a single power supply device, regardless of characteristics (the rated current values) of the illumination heads.

However, in the conventional example of the document 1, it is required to more enhance accuracy of detecting the resistance value of the identification resistor with increase in the number of the plural types of illumination heads (light source devices). Also, when light emission colors or color temperatures are different in addition to the rated current values as the characteristics of the plural types of illumination heads, it is hard to identify the type of the connected illumination head by only the resistance value of the identification resistor.

SUMMARY

It is an object of the present technology to provide a light source device, a lighting device and a luminaire, which can enhance accuracy of identifying characteristics of a light source.

A light source device according to an aspect of the present invention includes: light sources; switches that are connected with the light sources in series, respectively; and a control unit that is configured to turn on and off the switches. Each of the light sources includes one or more solid light emitting elements. The control unit is configured to, after a DC voltage applied to the light sources exceeds a prescribed threshold, turn on and off the switches in prescribed order.

A lighting device according to an aspect of the present invention includes a power supply and a controller. The power supply is configured to be electrically connected with the light source device. The power supply is further configured to be capable of changing a DC output voltage and a DC output current. The controller is configured to control the power supply to adjust the DC output voltage and the DC output current. The controller is further configured to, after the DC output voltage applied to the light source device exceeds the prescribed threshold, acquire the characteristics of the light sources of the light source device based on a change in a voltage level of the DC output voltage applied to the light source device.

A luminaire according to an aspect of the present invention includes the light source device, a lighting device, and a luminaire body configured to support at least the light source device. The lighting device includes a power supply and a controller. The power supply is configured to be electrically connected with the light source device. The power supply is further configured to be capable of changing a DC output voltage and a DC output current. The controller is configured to control the power supply to adjust the DC output voltage and the DC output current. The controller is further configured to, after the DC output voltage applied to the light source device exceeds the prescribed threshold, acquire the characteristics of the light sources of the light source device based on a change in a voltage level of the DC output voltage applied to the light source device.

The light source device, lighting device and luminaire according to the present technology are configured to transmit characteristics of a light source, based on a voltage change depending on a pattern (regularity) of on and off of a switch. Therefore, the light source device, lighting device and luminaire according to the present technology can more enhance accuracy of identifying the characteristics of the light source, compared with the conventional example.

BRIEF DESCRIPTION OF THE DRAWINGS

The figures depict one or more implementations in accordance with the present teaching, by way of example only, not by way of limitations. In the figures, like reference numerals refer to the same or similar elements.

DETAILED DESCRIPTION

Hereinafter, a light source device, a lighting device and a luminaire according to an embodiment will be described in detail with reference to drawings.

Figure 1:
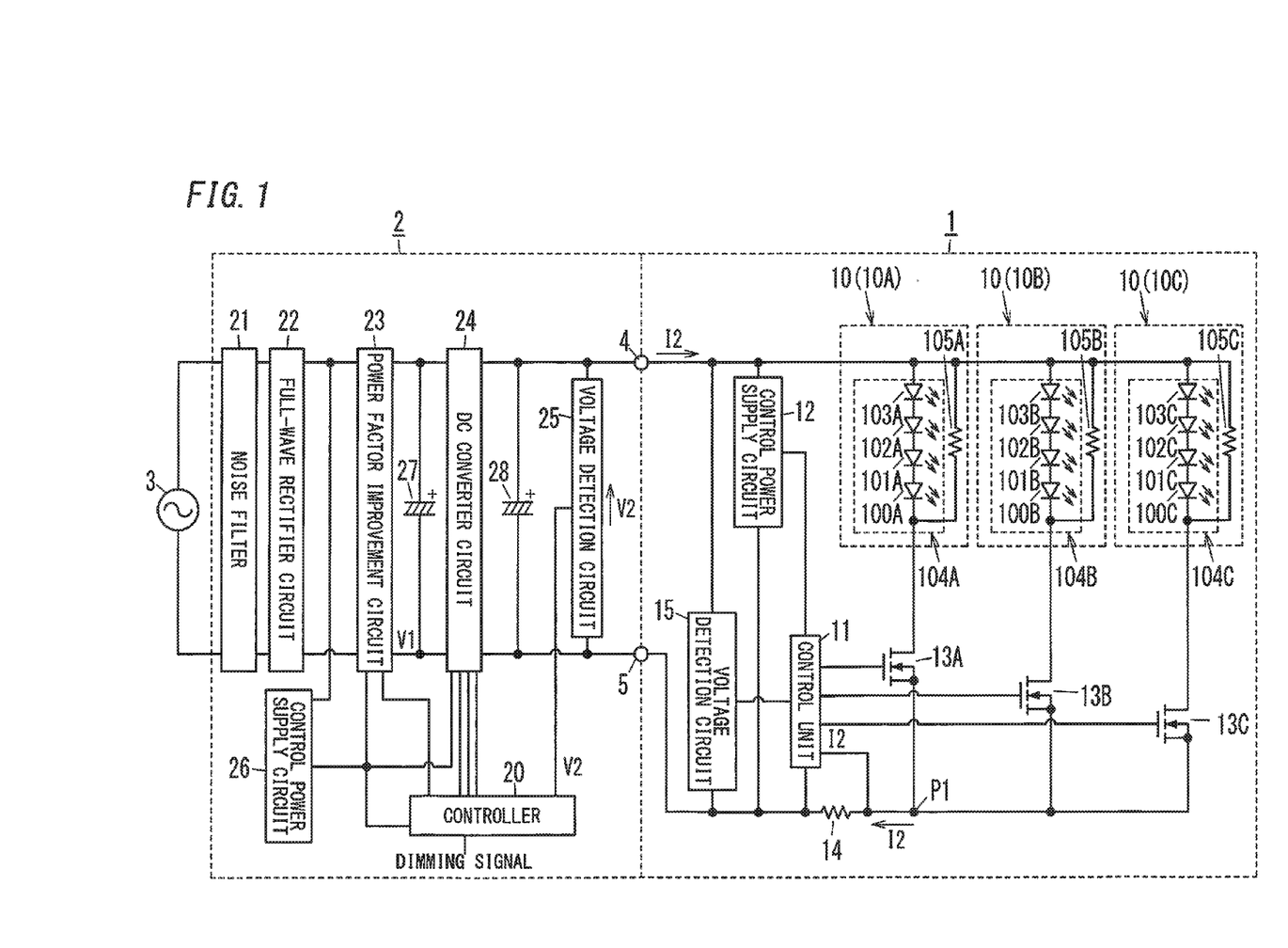
FIG. 1 is a circuit configuration diagram illustrating a light source device (a light source unit) and a lighting device (a power supply unit) according to an embodiment.

As shown in FIG. 1, the light source device (a light source unit 1) of the embodiment includes light sources 10 (10A, 10B and 10C; three in the illustrated example), and a circuit part. The light source 10A includes: a series circuit (LED array 104A) of light emitting diodes 100A, 101A, 102A and 103A (four in the illustrated example) as solid light emitting elements; and a resistor 105A that is connected in parallel with the LED array 104A. Also, the light source 10B includes: a series circuit (LED array 104B) of light emitting diodes 100B, 101B, 102B and 103B as solid light emitting elements; and a resistor 105B that is connected in parallel with the LED array 104B. Similarly, the light source 10C includes: a series circuit (LED array 104C) of light emitting diodes 100C, 101C, 102C and 103C as solid light emitting elements; and a resistor 105C that is connected in parallel with the LED array 104C. Hereinafter, the three light sources 10 are referred to as a first light source 10A, a second light source 10B and a third light source 10C, respectively.

The above-mentioned circuit part includes a control unit 11, a control power supply circuit 12, switches (switching elements) 13A, 13B and 13C, a resistor 14 and a voltage detection circuit 15. The circuit part is electrically connected with the lighting device (a power supply unit 2) via a first terminal 4 on a high potential side of the circuit part and a second terminal 5 on a low potential side of the circuit part.

The first terminal 4 is connected with a positive electrode of each of the light sources 10A, 10B and 10C (that is, an anode of each of the light emitting diodes 103A, 103B and 103C). The second terminal 5 is connected with a negative electrode of each of the light sources 10A, 10B and 10C (that is, a cathode of each of the light emitting diodes 100A, 100B and 100C). The switches 13A to 13C are configured by n-channel field-effect transistors. A source terminal of each of the switches 13A to 13C is connected with the second terminal 5. A drain terminal of the switch 13A (a first switch) is connected with a negative electrode of the first light source 10A. A gate terminal of the first switch 13A is connected with the control unit 11. Also, a drain terminal of the switch 13B (a second switch) is connected with a negative electrode of the second light source 10B. A gate terminal of the second switch 13B is connected with the control unit 11. Similarly, a drain terminal of the switch 13C (a third switch) is connected with a negative electrode of the third light source 10C. A gate terminal of the third switch 13C is connected with the control unit 11. The control unit 11 includes a Micro-Processing Unit (MPU), and gate terminals of the switches 13A to 13C are connected with output ports of the control unit 11, respectively. That is, the control unit 11 is configured to execute programs stored in a built-in memory and output a drive signal via a corresponding output port to turn on each of the switches 13A to 13C, individually.

The control power supply circuit 12 includes, as a main component, a constant voltage regulator IC, and is configured to generate a prescribed constant voltage, as a power supply for operating the control unit 11. The resistor 14 is disposed between the second terminal 5 and a connecting point P1 at which the negative electrodes of the light sources 10A to 10C are connected with each other. The control unit 11 is configured to detect (a magnitude of) an output current I2 of the power supply unit 2 based on a voltage across the resistor 14.

The voltage detection circuit 15 includes a resistance voltage-diving circuit that is connected in series between the first and second terminals 4 and 5. That is, the voltage detection circuit 15 is configured to output, to the control unit 11, a detection voltage that is proportional to an input voltage (an output voltage V2 of the power supply unit 2) applied between the first and second terminals 4 and 5.

As shown in FIG. 1, the power supply unit 2 includes a controller 20, a noise filter 21, a full-wave rectifier circuit 22, a power factor improvement circuit 23, a DC converter circuit 24, a voltage detection circuit 25 and a control power supply circuit 26, and smoothing capacitors 27 and 28.

The noise filter 21 is configured to remove harmonic noise in an AC voltage and an AC current supplied from an AC power source 3. The full-wave rectifier circuit 22 includes, for example, a diode bridge to perform full-wave rectification of the AC voltage and the AC current received via the noise filter 21.

The power factor improvement circuit 23 includes a well-known boosting chopper circuit, and is configured to boost, to a desired DC voltage V1, a pulsating voltage that is output from the full-wave rectifier circuit 22, and output the DC voltage V1.

The DC converter circuit 24 includes a well-known step-down chopper circuit, and is configured to step down the DC voltage V1 that is output from the power factor improvement circuit 23 and then smoothed by the smoothing capacitor 27. The smoothing capacitor 28 is connected between output terminals of the DC converter circuit 24. A DC voltage V2 (smaller than the DC voltage V1) that is output from the DC converter circuit 24 and then smoothed by the smoothing capacitor 28 is supplied to the light source unit 1 via the first and second terminals 4 and 5. Hereinafter, the DC voltage V2 is referred to as an "output voltage" V2.

The first terminal 4 is connected with an output terminal on a high potential side of the DC converter circuit 24 and an end on a high potential side of the smoothing capacitor 28. The second terminal 5 is connected with an output terminal on a low potential side of the DC converter circuit 24 and an end on a low potential side of the smoothing capacitor 28.

The controller 20 is configured to independently control the power factor improvement circuit 23 and the DC converter circuit 24, individually. However, the controller 20 may include an integrated circuit for controlling the power factor improvement circuit 23, an integrated circuit for controlling the DC converter circuit 24, and an integrated circuit for controlling those two integrated circuits.

The voltage detection circuit 25 includes a resistance voltage-diving circuit that is connected in parallel with the smoothing capacitor 28. That is, the voltage detection circuit 25 is configured to output, to the controller 20, a detection voltage that is proportional to a voltage (the output voltage V2 of the power supply unit 2) across the smoothing capacitor 28.

The controller 20 is configured to apply a feedback control to the power factor improvement circuit 23 so as to make the DC voltage V1 agree with a prescribed target value. The controller 20 is further configured to apply a feedback control to the DC converter circuit 24 so as to make the output voltage V2 agree with a prescribed value. In addition, the controller 20 is configured to intermittently operate the DC converter circuit 24 in response to a light control level (a dimming level) indicated by a light control signal (a dimming signal) to perform burst light control (burst dimming control). Note that, the burst light control mentioned here is a light control method of adjusting (controlling) light quantity of each of the light sources 10A to 10C by periodically turning on and off current flowing to the light sources 10A to 10C at a prescribed burst period to change a ratio of an ON-period (a duty ratio).

Figure 2:
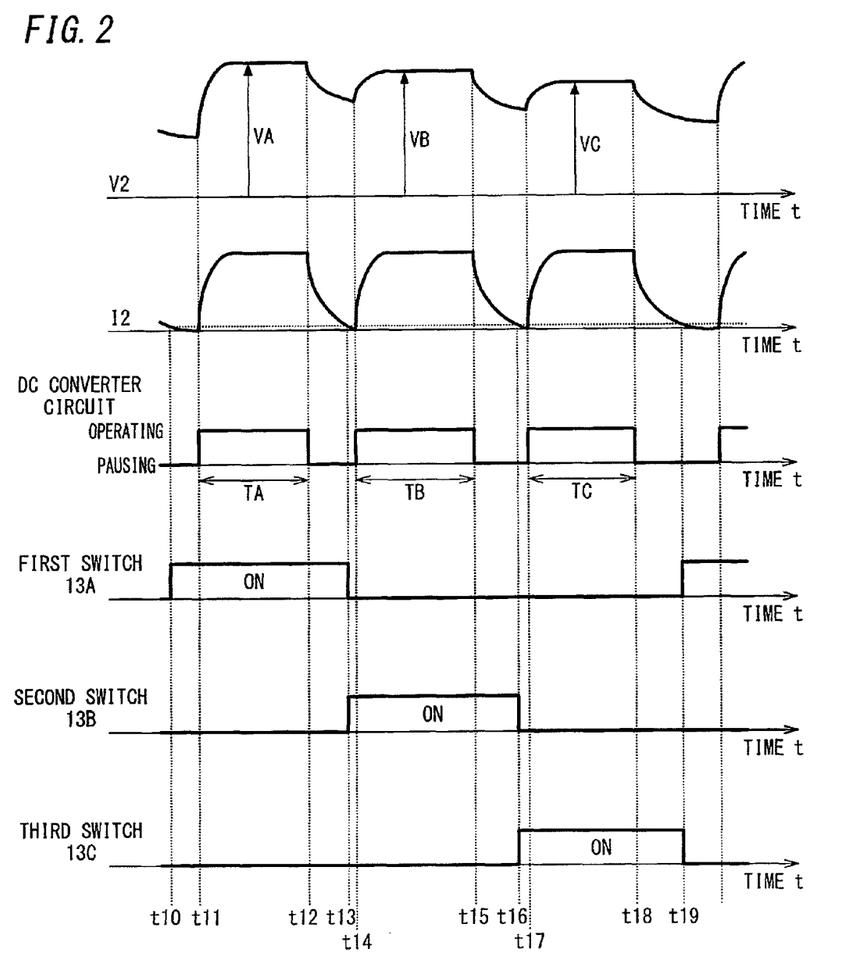
FIG. 2 is a time chart for explaining operation of the light source device and the lighting device in a steady-state according to the embodiment.

Next, operation of the light source unit 1 and power supply unit 2, in a steady-state (stable lighting state), of the embodiment will be described with reference to a time chart of FIG. 2. Here, the output current I2 in FIG. 2 denotes an output current of the power supply unit 2 (see FIG. 1).

The controller 20 of the power supply unit 2 intermittently operates the DC converter circuit 24 at a duty ratio (a ratio of an operating period (ON period) to a burst period) depending on a content indicated by the light control signal. The control unit 11 of the light source unit 1 turns on only the first switch 13A (at a time t=t10), when detecting that the output current I2 is reduced to a prescribed value or less in a pause period (OFF state) of the DC converter circuit 24. Note that, in the pause period of the DC converter circuit 24, electric charge stored in the smoothing capacitor 28 before the pause period is discharged, and accordingly, the output current I2 is kept to be supplied to the light source unit 1.

The controller 20 starts operation of the DC converter circuit 24 (at the time t=t11) after the pause period (OFF state). When the output current I2 is output by the operation of the DC converter circuit 24, a voltage across the smoothing capacitor 28 (the output voltage V2) is increased to a value (VA) of a forward voltage across the first light source 10A connected in series with the first switch 13A.

The controller 20 temporarily stops the operation of the DC converter circuit 24 at a time point (the time t=t12) when an operating period (a first operating period TA) corresponding to the first light source 10A elapses after a time point (the time t=t11) of starting the operation of the DC converter circuit 24, and starts clocking of a pause period corresponding to the first light source 10A.

The control unit 11 of the light source unit 1 turns on only the second switch 13B (at the time t=t13), when detecting that the output current I2 is reduced to a prescribed value or less in the pause period corresponding to the first light source 10A.

The controller 20 starts the operation of the DC converter circuit 24 (at the time t=t14) after the pause period corresponding to the first light source 10A. When the output current I2 is output by the operation of the DC converter circuit 24, the output voltage V2 is increased to a value (VB) of a forward voltage across the second light source 10B connected in series with the second switch 13B.

The controller 20 temporarily stops the operation of the DC converter circuit 24 at a time point (the time t=t15) when an operating period (a second operating period TB) corresponding to the second light source 10B elapses after a time point (the time t=t14) of starting the operation of the DC converter circuit 24, and starts clocking of a pause period corresponding to the second light source 10B.

The control unit 11 of the light source unit 1 turns on only the third switch 13C (at the time t=t16), when detecting that the output current I2 is reduced to a prescribed value or less in the pause period corresponding to the second light source 10B.

The controller 20 starts the operation of the DC converter circuit 24 (at the time t=t17) after the pause period corresponding to the second light source 10B. When the output current I2 is output by the operation of the DC converter circuit 24, the output voltage V2 is increased to a value (VC) of a forward voltage across the third light source 10C connected in series with the third switch 13C.

The controller 20 temporarily stops the operation of the DC converter circuit 24 at a time point (the time t=t18) when an operating period (a third operating period TC) corresponding to the third light source 10C elapses after a time point (the time t=t17) of starting the operation of the DC converter circuit 24, and starts clocking of a pause period corresponding to the third light source 10C.

As described above, the control unit 11 is configured to alternatively turn on the three switches 13A to 13C in prescribed order at a prescribed cycle (hereinafter, referred to as a "switch cycle"). Here, when the three switches 13A to 13C have light emission colors different from each other, it is possible to adjust (control) color and quantity of light (illumination light) to be emitted to an illumination space from the light source unit 1, according to a ratio of the respective operating periods TA, TB and TC corresponding to the light sources 10A to 10C. The switch cycle is preferably set to be in a range of $\frac{1}{1000}$ sec to $\frac{1}{120}$ sec so that switching of the light sources 10A to 10C is less likely to be perceived by people around. Note that, the control unit 11 is not limited to a configuration of cyclically lighting the three light sources 10A to 10C sequentially. The control unit 11 may be configured to light only any one of the three light sources 10A to 10C, or alternatively light any two of the three light sources 10A to 10C.

Figure 3:
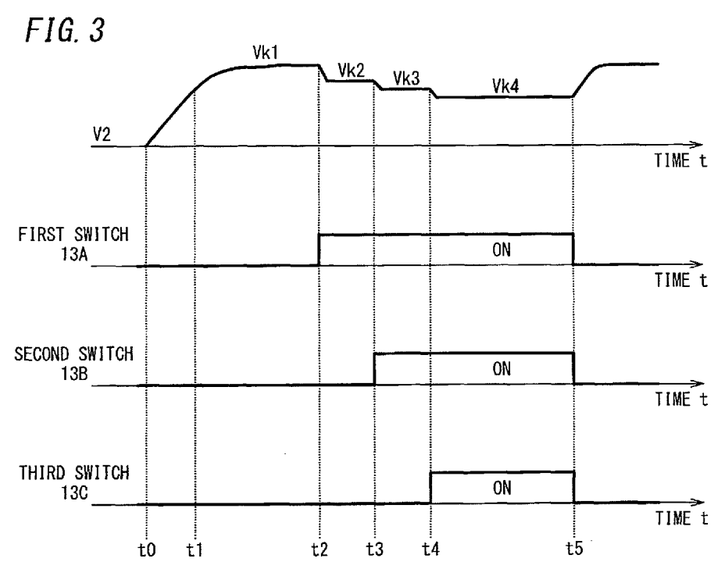
FIG. 3 is a time chart for explaining operation of the light source device and the lighting device, immediately after activation time, according to the embodiment.

Next, characteristic operation (just after starting) of the light source unit 1 and the power supply unit 2 of the embodiment will be described with reference to a time chart of FIG. 3.

When the AC power source 3 starts power supply to the power supply unit 2 at a time t=t0, the smoothing capacitor 27 is charged up to a peak voltage of a power supply voltage (about 141 V in a case where an effective value is 100 V). In addition, the control power supply circuit 26 is activated and provides a control power supply to the controller 20, and accordingly, the controller 20 is also activated. The smoothing capacitor 28 is charged up to a voltage value of Vk1 that is determined by impedance of the light source unit 1 at the time t=t0.

When the output voltage V2 is increased and the control power supply circuit 12 of the light source unit 1 becomes a state capable of providing a control power supply, the control unit 11 is activated (at the time t=t1). The control unit 11 starts, when its operation becomes a stable state, a processing (program) of transmitting identification information to the controller 20 of the power supply unit 2. Note that, the controller 20 is configured to perform constant current control, by a current value sufficiently lower than a target value (output current I2) described later, through the power factor improvement circuit 23 and the DC converter circuit 24 before completion of the processing of transmitting the identification information. The sufficiently low current value mentioned here is preferably in a range that no light source emits light, for example.

The control unit 11 first turns on only the first switch 13A at the time t=t2. Due to an ON-state of the first switch 13A, current flows through the resistor 105A of the first light source 10A, and accordingly, the impedance of the light source unit 1 is reduced. As a result, the output voltage V2 of the power supply unit 2 is also reduced from Vk1 to Vk2. The controller 20 detects the output voltage V2 of the DC converter circuit 24 (voltage across the smoothing capacitor 28) with the voltage detection circuit 25, and stores, in a built-in memory, information that the output voltage V2 has been reduced from Vk1 to Vk2.

The control unit 11 turns on the second switch 13B at the time t=t3 while keeping the ON-state of the first switch 13A. Due to an ON-state of the second switch 13B, current flows through the resistor 105B of the second light source 10B in addition to the resistor 105A of the first light source 10A, and accordingly, the impedance of the light source unit 1 is further reduced. As a result, the output voltage V2 of the power supply unit 2 is also reduced from Vk2 to Vk3. The controller 20 stores, in the built-in memory, information that the output voltage V2 has been reduced from Vk2 to Vk3, detected by the voltage detection circuit 25.

The control unit 11 turns on the third switch 13C at the time t=t4 while keeping the ON-states of the first and second switches 13A and 13B. Due to an ON-state of the third switch 13C, current flows through the resistor 105C of the third light source 10C in addition to the resistors 105A and 105B of the first and second light sources 10A and 10B, and accordingly, the impedance of the light source unit 1 is further reduced. As a result, the output voltage V2 of the power supply unit 2 is also reduced from Vk3 to Vk4. The controller 20 stores, in the built-in memory, information that the output voltage V2 has been reduced from Vk3 to Vk4, detected by the voltage detection circuit 25.

Then, the control unit 11 turns off all of the switches 13A to 13C at the time t=t5 to complete the processing (program) of transmitting the identification information. Due to OFF-states of all of the switches 13A to 13C, no current flows through all of the resistors 105A to 105C of the light sources 10A to 10C. As a result, the impedance of the light source unit 1 is returned to a value before the time t=t2, and accordingly, the output voltage V2 of the power supply unit 2 is also returned from Vk4 to Vk1.

When the output voltage V2 detected by the voltage detection circuit 25 is returned to an initial value (Vk1), the controller 20 determines that the processing of transmitting the identification information by the control unit 11 has been completed Then, the controller 20 identifies characteristics of the light source unit 1 based on a detection result related to the output voltage V2 stored in the built-in memory, namely, a pattern in which the output voltage V2 changes from Vk1 to Vk4 via Vk2 and Vk3.

In other words, the controller 20 can acquire characteristics that the light source unit 1 includes three light sources 10A to 10C, based on the output voltage V2 changing from the initial value (Vk1) in three stages (Vk2, Vk3 and Vk4). Further, the controller 20 can acquire other characteristics, such as a rated current value or a light emission color of each of the light sources 10A to 10C, based on time periods during which respective values (Vk2, Vk3 and Vk4) are maintained.

The controller 20 determines a cycle of intermittently operating the DC converter circuit 24 (that is, the switch cycle for the switches 13A to 13C), according to the number of light sources (three in the embodiment). In addition, the controller 20 determines a target value (output current I2) for performing constant current control of the DC converter circuit 24, according to the rated current value or the light emission color of each of the light sources 10A to 10C. After that, the controller 20 performs, at the determined target value, the constant current control of the DC converter circuit 24. Note that, the controller 20 performs, at a current value sufficiently lower than the target value, the constant current control of the DC converter circuit 24 until the target value is determined after starting.

Figure 4:
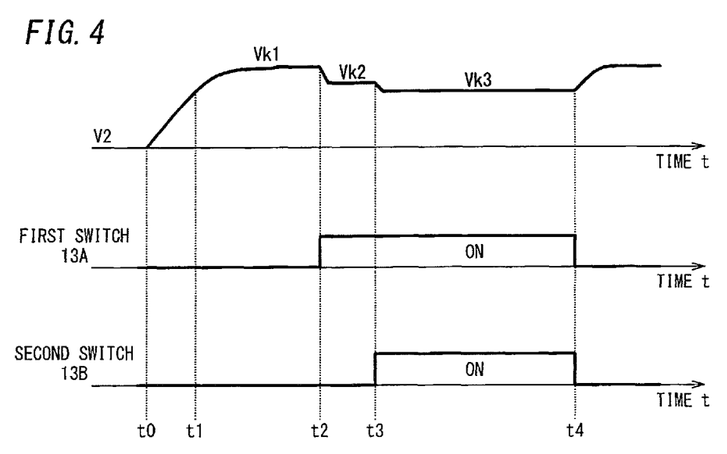
FIG. 4 is a time chart for explaining operation of the light source device and the lighting device, immediately after activation time, according to the embodiment.

Here, in a case where the light source unit 1 includes only two light sources 10A and 10B, as shown in FIG. 4, it is preferred that the control unit 11 is configured to turn on the first switch 13A and the second switch 13B in that order, and then turn off all of the two switches at the same time. In this case, the controller 20 can acquire characteristics that the light source unit 1 includes two light sources 10A and 10B, based on the output voltage V2 changing from the initial value (Vk1) in two stages (Vk2 and Vk3). Note that, the number of light sources 10 of the light source unit 1 may be one, or four or more. Similarly, the number of switches may be one, or four or more. The resistors 105A to 105C respectively connected in parallel with the LED arrays 104A to 104C may have the same resistance values, or different resistance values. If those resistors 105A to 105C have resistance values different from each other, it is possible to more easily identify a change in the output voltage V2.

Here, in order to attain reduction of manufacturing cost, for example, it is preferred to use a substrate on which three light sources 10A to 10C can be mounted, even when the light source unit 1 includes only two light sources 10A and 10B. That is, one type of substrate can be used in the cases of two types of light source units 1. Alternatively, electrically connecting of the light sources 10A to 10C and the circuit part may be achieved by a connector.

Figure 5:
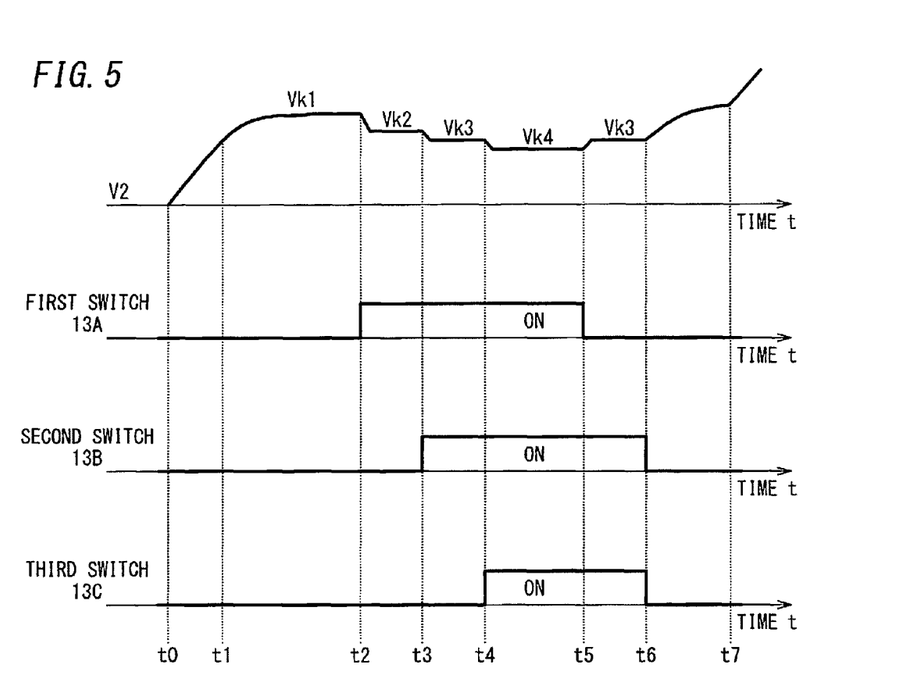
FIG. 5 is a time chart for explaining operation of the light source device and the lighting device, immediately after activation time, according to the embodiment.

As described above, the light source device (light source unit 1) of the embodiment includes: light sources 10A to 10C; switches 13A to 13C that are connected with the light sources 10A to 10C in series, respectively; and a control unit 11 that is configured to turn on and off the switches 13A to 13C. Each of the light sources 10A to 10C includes one or more solid light emitting elements ((10A: light emitting diodes 100A, 101A, 102A and 103A), (10B: light emitting diodes 100B, 101B, 102B and 103B) and (10C: light emitting diodes 100C, 101C, 102C and 103C)). The control unit 11 is configured to, after a DC voltage V2 applied to the light sources 10A to 10C exceeds a prescribed threshold (Vk1), turn on and off the switches 13A to 13C in prescribed order depending on characteristics of the light sources 10A to 10C. Here, the prescribed order depending on the characteristics of the light sources 10A to 10C means order depending on characteristics information (such as the number of light sources, rated current values, light emission colors, or color temperatures) of the light sources 10A to 10C to be transmitted. For example, when the characteristics information to be transmitted includes the number of light sources, it is preferred that, as shown in FIG. 3, the switches 13A to 13C are successively turned on, and then all of the switches 13A to 13C are simultaneously turned off. For example, when the characteristics information to be transmitted includes, in addition to the number of light sources, other information (such as rated current values, light emission colors, or color temperatures), it is preferred that, as shown in FIG. 5, the switches 13A to 13C are successively turned on, and then at least one of the switches 13A to 13C is turned off and then the remaining switches are simultaneously turned off.

The lighting device (power supply unit 2) of the embodiment includes a power supply (DC converter circuit 24) and a controller 20. The power supply (DC converter circuit 24) is configured to be electrically connected with the light source device (light source unit 1). The power supply (DC converter circuit 24) is further configured to be capable of changing a DC output voltage V2 and a DC output current I2. The controller 20 is configured to control the power supply (DC converter circuit 24) to adjust the DC output voltage V2 and the DC output current I2. The controller 20 is further configured to, after the DC output voltage V2 applied to the light source device (light source unit 1) exceeds the prescribed threshold, acquire (know) the characteristics of the light sources 10A to 10C of the light source device (light source unit 1), based on a change in a voltage level of the DC output voltage V2 applied to the light source device (light source unit 1).

The light source device (light source unit 1) and the lighting device (power supply unit 2) of the embodiment as above are configured to transmit characteristics of the light sources, based on a voltage change depending on a pattern (regularity) of on and off of the switches 13A to 13C. Therefore, it is possible to more enhance accuracy of identifying characteristics of the light sources 10A to 10C, compared with the conventional example.

In the light source device (light source unit 1) of the embodiment, the control unit 11 is preferably configured to output, to an outside, an information set related to the characteristics of the light sources 10A to 10C, by turning on and off the switches 13A to 13C in the prescribed order. Note that, the control unit 11 is preferably configured to output, to the outside, the number of the light sources 10A to 10C and a rated current value of each light source, as the information set.

In a configuration of transmitting characteristics of a light source obtained by a resistor as the conventional example, it is hard to transmit various information accurately. On the other hand, because the light source device (light source unit 1) of the embodiment is configured as above, it is possible to transmit various information (the information set) accurately.

Here, as shown in FIG. 5, the control unit 11 may be configured to turn off only any one of the three switches (e.g., the first switch 13A) first (at the time t=t5), and then turn off the two remaining switches 13B and 13C at the same time (at the time t=t6). In this case, the controller 20 can acquire (know) characteristics, such as color temperatures, of the light sources 10A to 10C, based on a pattern in which the output voltage V2 changes from the initial value (Vk1) in four stages (Vk2, Vk3, Vk4 and Vk3 in that order). Note that, the pattern in which the control unit 11 turns on and off the switches 13A to 13C is not limited to the abovementioned two patterns.

In the example of FIG. 5, the controller 20 determines the switch cycle and a target value of the output current I2 according to characteristics of the light sources 10A to 10C, after the output voltage V2 is returned to the initial value (Vk1) (at the time t=t6). Then, the controller 20 controls the DC converter circuit 24, based on the determined switch cycle and target value of the output current I2 after the time t=t7. However, the controller 20 is preferably configured to, when determining that the characteristics of the light sources 10 transmitted from the control unit 11 is inappropriate (for example, in a case where the number of light sources 10 exceeds an upper limit), stop the operation of the power factor improvement circuit 23 and the DC converter circuit 24. Alternatively, the controller 20 may be configured to, when determining that the characteristics of the light sources 10 transmitted from the control unit 11 is inappropriate, set, to a value lower than normal, the target value for performing the constant current control of the DC converter circuit 24 to reduce the output current I2.

In the lighting device (power supply unit 2) of the embodiment, the controller 20 is preferably configured to, when determining that the characteristics of the light sources 10 is inappropriate, control the power supply (DC converter circuit 24) to reduce or stop the DC output voltage V2 and the DC output current I2.

Because the lighting device (power supply unit 2) of the embodiment is configured as above, it is possible to prevent a situation where the lighting device (power supply unit 2) is not operated normally due to power supply to the inappropriate light source device (light source unit 1).

Figure 6:
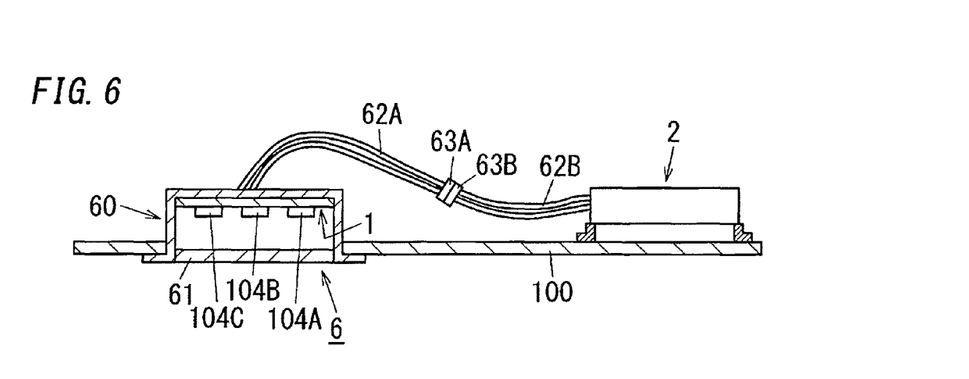
FIG. 6 is a sectional view of a luminaire according to the embodiment.

FIG. 6 shows a luminaire 6 of the embodiment.

The luminaire 6 of the embodiment is a downlight to be embedded in a ceiling member 100. The luminaire 6 includes the light source unit 1, a luminaire body 60 that houses therein and supports the light source unit 1, and the power supply unit 2 that is installed on the reverse side (upper side) of the ceiling member 100.

The luminaire body 60 is formed of metal material, such as aluminum die-cast material, into a cylinder shape with a bottom face and an opened top face (a lower face in FIG. 6). The LED arrays 104A to 104C are attached on an inner bottom surface of the luminaire body 60. The opened lower face of the luminaire body 60 is covered with a disk-shaped cover 61. The cover 61 is made of light transmissive material, such as glass or polycarbonate.

The power supply unit 2 is housed in a metal-made case that is formed into a rectangular box shape. The light source unit 1 and the power supply unit 2 are electrically connected with each other via power cables 62A and 62B, and connectors 63A and 63B.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A light source device connectable to an output of a lighting device, comprising:
    light sources;
    switches that are connected in series with the light sources, respectively; and
    a control unit configured to turn on and off the switches to control and perform identification processing of the light sources,
    wherein each of the light sources comprises one or more solid light emitting elements,
    wherein the control unit is configured to turn on and off the switches in a prescribed order depending on characteristics of the light sources,
    wherein the control unit is configured to output to the lighting device identification information for identifying the characteristics of the light sources,
    wherein the control unit obtains the identification information by the identification processing as follows:
        turning on a first switch of the switches, detecting a first reduction in an output voltage of the lighting device, and storing information regarding the first reduction,
        turning on a second switch of the switches while the first switch remains on, detecting a second reduction in the output voltage of the lighting device, and storing information regarding the second reduction, and
        turning off the switches to complete identification processing,
    wherein the control unit is configured, in the identification processing, to obtain as the characteristics of the light sources a number of the lights sources and at least one of:
        rated current values of the light sources,
        light emission colors of the light sources, and
        color temperatures of the light sources.

2. The light source device according to claim 1, wherein the control unit is configured to output, to an outside, the identification information that includes an identification information set related to the characteristics of the light sources, by turning on and off the switches in the prescribed order.

3. The light source device according to claim 2, wherein the control unit is configured to output, to the outside, a number of the light sources and a rated current value of each light source, as the identification information set.

4. A lighting device, comprising a power supply and a controller,
the power supply being configured to be electrically connected with the light source device according to claim 1,
the power supply being further configured to be capable of changing a DC output voltage and a DC output current,
the controller being configured to control the power supply to adjust the DC output voltage and the DC output current,
the controller being further configured to, after the DC output voltage applied to the light source device exceeds the prescribed threshold, acquire identification information based on a change in a voltage level of the DC output voltage applied to the light source device, and
the controller being further configured to identify the characteristics based on the identification information, and then perform constant current control at a target value according to the characteristics.

5. A lighting device, comprising a power supply and a controller,
the power supply being configured to be electrically connected with the light source device according to claim 2,
the power supply being further configured to be capable of changing a DC output voltage and a DC output current,
the controller being configured to control the power supply to adjust the DC output voltage and the DC output current,
the controller being further configured to, after the DC output voltage applied to the light source device exceeds the prescribed threshold, acquire identification information based on a change in a voltage level of the DC output voltage applied to the light source device, and
the controller being further configured to identify the characteristics based on the identification information, and then perform constant current control at a target value according to the characteristics.

6. A lighting device, comprising a power supply and a controller,
the power supply being configured to be electrically connected with the light source device according to claim 3,
the power supply being further configured to be capable of changing a DC output voltage and a DC output current,
the controller being configured to control the power supply to adjust the DC output voltage and the DC output current,
the controller being further configured to, after the DC output voltage applied to the light source device exceeds the prescribed threshold, acquire identification information based on a change in a voltage level of the DC output voltage applied to the light source device, and
the controller being further configured to identify the characteristics based on the identification information, and then perform constant current control at a target value according to the characteristics.

7. The lighting device according to claim 4, wherein the controller is configured to, when determining that the characteristics of the light sources is inappropriate, control the power supply to reduce or stop the DC output voltage and the DC output current.

8. The lighting device according to claim 5, wherein the controller is configured to, when determining that the characteristics of the light sources is inappropriate, control the power supply to reduce or stop the DC output voltage and the DC output current.

9. The lighting device according to claim 6, wherein the controller is configured to, when determining that the characteristics of the light sources is inappropriate, control the power supply to reduce or stop the DC output voltage and the DC output current.

10. A luminaire, comprising the light source device according to claim 1, a lighting device, and a luminaire body configured to support at least the light source device,
the lighting device comprising a power supply and a controller,
the power supply being configured to be electrically connected with the light source device,
the power supply being further configured to be capable of changing a DC output voltage and a DC output current,
the controller being configured to control the power supply to adjust the DC output voltage and the DC output current,
the controller being further configured to, after the DC output voltage applied to the light source device exceeds the prescribed threshold, acquire identification information based on a change in a voltage level of the DC output voltage applied to the light source device, and
the controller being further configured to identify the characteristics based on the identification information, and then perform constant current control at a target value according to the characteristics.

11. A luminaire, comprising the light source device according to claim 2, a lighting device, and a luminaire body configured to support at least the light source device,
the lighting device comprising a power supply and a controller,
the power supply being configured to be electrically connected with the light source device,
the power supply being further configured to be capable of changing a DC output voltage and a DC output current,
the controller being configured to control the power supply to adjust the DC output voltage and the DC output current,
the controller being further configured to, after the DC output voltage applied to the light source device exceeds the prescribed threshold, acquire identification information based on a change in a voltage level of the DC output voltage applied to the light source device, and the controller being further configured to identify the characteristics based on the identification information, and then perform constant current control at a target value according to the characteristics.

12. A luminaire, comprising the light source device according to claim 3, a lighting device, and a luminaire body configured to support at least the light source device,
the lighting device comprising a power supply and a controller,
the power supply being configured to be electrically connected with the light source device,
the power supply being further configured to be capable of changing a DC output voltage and a DC output current,
the controller being configured to control the power supply to adjust the DC output voltage and the DC output current,
the controller being further configured to, after the DC output voltage applied to the light source device exceeds the prescribed threshold, acquire identification information based on a change in a voltage level of the DC output voltage applied to the light source device, and
the controller being further configured to identify the characteristics based on the identification information, and then perform constant current control at a target value according to the characteristics.

13. The luminaire according to claim 10, wherein the controller is configured to, when determining that the characteristics of the light sources is inappropriate, control the power supply to reduce or stop the DC output voltage and the DC output current.

14. The luminaire according to claim 11, wherein the controller is configured to, when determining that the characteristics of the light sources is inappropriate, control the power supply to reduce or stop the DC output voltage and the DC output current.

15. The luminaire according to claim 12, wherein the controller is configured to, when determining that the characteristics of the light sources is inappropriate, control the power supply to reduce or stop the DC output voltage and the DC output current.

16. The light source device according to claim 1,
wherein the characteristics includes the number of the light sources, and
wherein the control unit is configured to successively turn on the switches and then simultaneously turn off all of the switches, as the prescribed order.

17. The light source device according to claim 1,
wherein the characteristics includes at least one of the rated current values, the light emission colors and the color temperatures, and
wherein the control unit is configured to successively turn on the switches, then turn off at least one of the switches, and then simultaneously turn off remaining switches, as the prescribed order.

18. A light source device connectable to an output of a lighting device, comprising:
light sources;
switches that are connected in series with the light sources, respectively; and
a control unit configured to turn on and off the switches to control and perform identification processing of the light sources,
wherein each of the light sources comprises one or more solid light emitting elements,
wherein the control unit is configured to turn on and off the switches in a prescribed order depending on characteristics of the light sources,
wherein the control unit is configured to output to the lighting device identification information for identifying the characteristics of the light sources,
wherein the control unit obtains the identification information by the identification processing as follows:
turning on a first switch of the switches, detecting a first reduction in an output voltage of the lighting device, and storing information regarding the first reduction,
turning on a second switch of the switches while the first switch remains on, detecting a second reduction in the output voltage of the lighting device, and storing information regarding the second reduction, and
turning off at least one of the switches and then simultaneously turning off all of the switches that remain on to complete identification processing,
wherein the control unit is configured, in the identification processing, to obtain as the characteristics of the light sources a number of the lights sources and at least one of:
rated current values of the light sources,
light emission colors of the light sources, and
color temperatures of the light sources.

19. A light source device connectable to an output of a lighting device, comprising:
light sources;
switches that are connected in series with the light sources, respectively; and
a control unit configured to turn on and off the switches to control and perform identification processing of the light sources,
wherein each of the light sources comprises one or more solid light emitting elements,
wherein the control unit is configured to turn on and off the switches in a prescribed order depending on characteristics of the light sources,
wherein the control unit is configured to output to the lighting device identification information for identifying the characteristics of the light sources,
wherein the control unit obtains the identification information by the identification processing as follows:
turning on a first switch of the switches, detecting a first reduction in an output voltage of the lighting device, and storing information regarding the first reduction,
turning on a second switch of the switches while the first switch remains on, detecting a second reduction in the output voltage of the lighting device, and storing information regarding the second reduction, and
turning off the switches to complete identification processing,
wherein the control unit is configured, in the identification processing, to obtain as the characteristics of the light sources at least one of:
rated current values of the light sources,
light emission colors of the light sources, and
color temperatures of the light sources.

20. A light source device connectable to an output of a lighting device, comprising:
light sources;
switches that are connected in series with the light sources, respectively; and a control unit configured to turn on and off the switches to control and perform identification processing of the light sources, wherein each of the light sources comprises one or more solid light emitting elements, wherein the control unit is configured to turn on and off the switches in a prescribed order depending on characteristics of the light sources, wherein the control unit is configured to output to the lighting device identification information for identifying the characteristics of the light sources, wherein the control unit obtains the identification information by the identification processing as follows:
  turning on a first switch of the switches, detecting a first reduction in an output voltage of the lighting device, and storing information regarding the first reduction,
  turning on a second switch of the switches while the first switch remains on, detecting a second reduction in the output voltage of the lighting device, and storing information regarding the second reduction, and
  turning off at least one of the switches and then simultaneously turning off all of the switches that remain on to complete identification processing, wherein the control unit is configured, in the identification processing, to obtain as the characteristics of the light sources at least one of:
  rated current values of the light sources,
  light emission colors of the light sources, and
  color temperatures of the light sources.

* * * * *